(12) United States Patent
Deng

(10) Patent No.: US 7,936,776 B2
(45) Date of Patent: *May 3, 2011

(54) SMOOTH CAPACITY EXPANSION METHOD AND SYSTEM FOR DATA COMMUNICATION PRODUCTS

(75) Inventor: Chaojun Deng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 521 days.

This patent is subject to a terminal disclaimer.

(21) Appl. No.: 11/608,765

(22) Filed: Dec. 8, 2006

(65) Prior Publication Data

US 2007/0140231 A1 Jun. 21, 2007

Related U.S. Application Data

(63) Continuation of application No. 09/827,127, filed on Apr. 5, 2001.

(30) Foreign Application Priority Data

Aug. 1, 2000 (CN) .................................. 00 1 22430

(51) Int. Cl.
*H04L 12/66* (2006.01)
(52) U.S. Cl. ........................................ 370/463; 710/300
(58) Field of Classification Search .................. None
See application file for complete search history.

(56) References Cited

U.S. PATENT DOCUMENTS

| | | | |
|---|---|---|---|
| 5,734,656 A | 3/1998 | Prince et al. | |
| 6,018,529 A | 1/2000 | Toth | |
| 6,052,276 A | 4/2000 | Do et al. | |
| 6,122,273 A | 9/2000 | Cantwell et al. | |
| 6,128,300 A | 10/2000 | Horton | |
| 6,310,882 B1 | 10/2001 | Lorenz et al. | |
| 6,570,981 B1 * | 5/2003 | Weir et al. | 379/325 |
| 6,640,273 B1 * | 10/2003 | Spisak et al. | 710/104 |
| 6,667,973 B1 | 12/2003 | Gorshe et al. | |
| 6,981,078 B2 * | 12/2005 | Paul | 710/100 |
| 7,042,900 B2 * | 5/2006 | Czerwiec et al. | 370/463 |
| 2002/0118638 A1 | 8/2002 | Donahue et al. | |
| 2006/0007946 A1 | 1/2006 | Kastenholz et al. | |

FOREIGN PATENT DOCUMENTS

EP 0977457 A 2/2000

* cited by examiner

*Primary Examiner* — Seema S Rao
*Assistant Examiner* — Rhonda Murphy

(57) ABSTRACT

This invention discloses a method for smooth capacity expansion of data communication product, and a smooth capacity expandable system of data communication. Architecture of the system at least comprises circuit card and switched network card; and further comprises interface card of switched network, interface transfer card and connection optical fiber. Based on these, it provides one kind of multiple frameworks structure with interconnection between frameworks. When the capacity is expanded, the original circuit cards and switched network cards keep unchanged, only smoothly increases the switched network cards and numbers of circuit card frameworks. Therefore, it implements smooth capacity expansion and client investment protection at the same time. With adding backup cards, it also implements capacity expansion without interrupting the service.

26 Claims, 4 Drawing Sheets

SMOOTH CAPACITY EXPANSION METHOD AND SYSTEM FOR DATA COMMUNICATION PRODUCTS

CROSS-REFERENCES TO RELATED APPLICATIONS

The present application is a continuation of U.S. patent application Ser. No. 09/827,127, filed Apr. 5, 2001, which is commonly assigned and incorporated by reference herein for all purposes, and claims priority to Chinese Patent Application No. 00122430.1, filed Aug. 1, 2000.

FIELD OF THE INVENTION

The present invention relates generally to a data communication system, and more particularly to a method for implementing smooth capacity expansion of data communication products and a data communication system, which is available for smooth capacity expansion.

BACKGROUND OF THE INVENTION

At present, users increasingly require more and more capacity of data communication products, such as ATM exchanges, routers, etc. The architecture of current ATM exchanges, routers, etc. mainly includes circuit cards, switched network cards, and a back plane connecting the circuit cards and switched network. Generally, such data communication products have a single framework structure. Accompanying the increased demand for capacity, the design of the products faces the following technical problems:

a) When capacity is more than hundreds of Gbit, there are many circuit cards, such as POS interface circuit cards, ATM interface circuit cards and Giga-bit interface cards etc. Power consumption of the whole machine is larger, and it is difficult to implement them with only one framework. Especially when the capacity of the product is over 160 Gbit, with present technology, the technical problems of structure cannot be solved with a single framework, and multiple frameworks may be required. With multiple frameworks, there are problems, such as interconnection between frameworks, main card and backup card switching etc., without successful design scheme.

b) Different markets of data communication have different requirements of rated capacity. Therefore, the manufacturer is asked to provide a series of products, such as 10 Gbit, 40 Gbit, 80 Gbit, 160 Gbit, 320 Gbit, 640 Gbit, 1.2 Tbit and several tens Tbit. At present, different series products provided by different manufacturers have different architectures. Although some manufacturers implement circuit card compatibility for one or two series in a single framework, the architecture needs to be changed. There is no successful solution with smooth capacity expansion for all series or from 40 Gbit to Tbit series.

c) As data communication develops rapidly, capacity requirements will increase. When a client purchases a data communication product, it is according to the capacity requirement at that time. Later, usually the capacity needs to be expanded. At present, when capacity expansion is needed, most manufacturers ask a client to purchase the new generation product so that most old products cannot be used again. In this case, the client needs to invest more for capacity expansion. Therefore, when capacity expansion is needed, it is valuable to protect as much as possible the original investment of a client. For data communication products investment of circuit cards occupies more than 60% of the hardware cost. Obviously, when a system is upgraded, circuit card compatibility will directly influence the client investment and expansion cost. According to the present technology, when capacity expansion is needed, it is often solved by replacing the product. Thus expansion problems are often solved by replacing a lower capacity product with a larger capacity product. Yet an upgrade of client equipment is expensive.

SUMMARY OF THE INVENTION

The present invention provides a method to implement smoothly capacity expansion for data communication products, and a smooth capacity expandable system for data communication. The invention allows a user to implement smooth capacity expansion from Gbit to Tbit. When capacity is expanded, the original equipment can also be used and the client investment is protected.

The present invention provides a method of implementing smooth capacity expansion for data communication products, in which the architecture of the data communication product includes at least a circuit card, a switched network card and a back plane. The method of the invention includes the following steps.

A special framework is set up for a switched network card. A switched network card, which is set in the framework, interconnects with an interface card of a switched network through the interface with a circuit card on it and a back plane.

Multiple frameworks are set up for a circuit card. A circuit card, which is set in the framework, interconnects with an interface transfer card through the interface switched network on it and a back plane, and each circuit card corresponds to one interface transfer card.

The interface card and interface card of the switched network correspond with each other one to one, and can be interconnected by optical fiber.

When increasing capacity, one can increase smoothly switched network cards and numbers of circuit card frameworks to implement smooth capacity expansion.

The above mentioned interface card of the switched network can be designed as a miniature structure. Multiple miniature interface cards of the switched network are inserted on a passive base card. Each of the miniature interface cards of the switched network can be inserted or removed independently. It connects with the switched network card through the passive base card and back plane.

The above mentioned interface transfer card can also be designed as a miniature structure. Multiple miniature cards of the interface transfer are inserted on a passive base card. Each of the miniature cards of the interface transfer can be inserted or removed independently. It connects with the circuit card through the passive base card and back plane.

The above mentioned switched network card can be equipped with a backup card. If the main card stops working, the backup card can replace the main card to assure the system works continuously.

The above mentioned circuit card can also be equipped with a backup card. When the main card stops working, the backup card can replace the main card to assure the system works continuously.

The present invention also provides a smooth capacity expandable system for data communication, its architecture comprising at least a circuit card and a switched network card. The system includes the following.

The data communication system includes an interface card for the switched network and an interface transfer card. The circuit card connects with the switched network card through the interface transfer card and interface card of the switched network.

The architecture of the data communication system of the invention further comprises a back plane. The switched network card connects with the interface card of the switched network through the interface of the circuit card on it and the back plane. The circuit card connects with the interface transfer card through interface of the switched network on it and the back plane.

The data communication system of the invention further includes a special framework for the switched network card. The switched network card and interface card of the switched network are included in the framework; the switched network card interconnects with the interface card of the switched network through the interface of the circuit card on it and the back plane. The system can further include multiple frameworks for the circuit cards. The circuit card and interface transfer card are within the frameworks; the circuit card interconnects with the interface transfer card through the interface of the switched network on it and the back plane. Each circuit card corresponds with an interface transfer card. An interface transfer card corresponds with an interface card of a switched network one to one, and their connections can be set by optical fiber.

When capacity of the system is expanded, the original switched network cards, circuit cards and back planes are unchanged. Smooth capacity expansion is implemented by increasing smoothly switched network cards and numbers of circuit card frameworks.

The data communication system of the invention can further comprise a passive base card. The interface card of the switched network can be a miniature structure. Multiple interface cards of the switched network can be inserted on a passive base card. Each of the miniature cards can be inserted and removed independently. They connect with switched network cards through the passive base card and the back plane.

The data communication system of the invention can further comprise another passive base card. The interface transfer card can be a miniature structure. Multiple interface transfer cards are inserted on a passive base card. Each of the miniature cards can be inserted and removed independently. They connect with circuit cards through the passive base card and the back plane.

According to the data communication system of the invention, the switched network cards can be further equipped with backup cards. When the main card stops working, the backup card can replace it to assure the system works continuously.

According to the data communication system of the invention, the circuit cards can also be equipped with back up cards. When the main card stops working, the backup card will replace it to assure the system works continuously.

The interface for the circuit card, which is on the switched network card, and the interface for the switched network, which is on the circuit card, all preferably use the same interface standard. Multiple pairs of the interfaces also preferably use the same speed.

The invention solves the interconnection between frameworks by using the interface transfer card, interface card of switched network and optical fiber. It has broken the limitation of framework space and volume, and makes capacity expansion possible. When the capacity is expanded, all original circuit cards and switched network cards are unchanged; in this way, client investment is protected and the cost of upgrade and capacity expansion is decreased greatly.

THE DRAWINGS

FIG. 1 schematically illustrates the structure of a circuit card.

FIG. 2 schematically illustrates the structure of a switched network card.

FIG. 3 schematically illustrates the interconnection between a switched network card and a circuit card in a single framework structure.

FIG. 4 is an outside view of an exemplary mechanical structure for a single framework.

FIG. 5 schematically illustrates the interconnection of the invention.

DETAILED DESCRIPTION OF THE INVENTION

In the following combining with the Figures, the invention is described in detail from circuit card structure, single framework structure to multiple frameworks structure in sequence. Among them, multiple frameworks structure and the expansion mode from single framework to multiple frameworks are more important to the invention.

Figure 1:
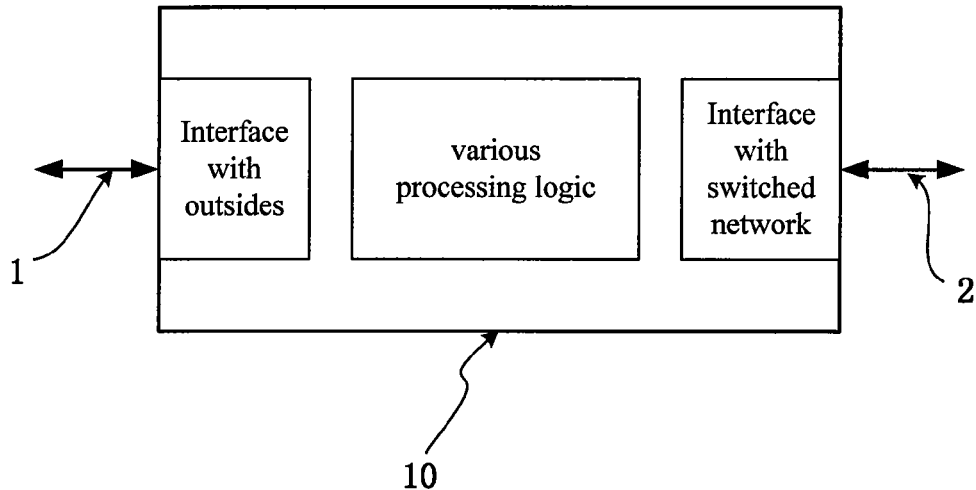
Figure 2:
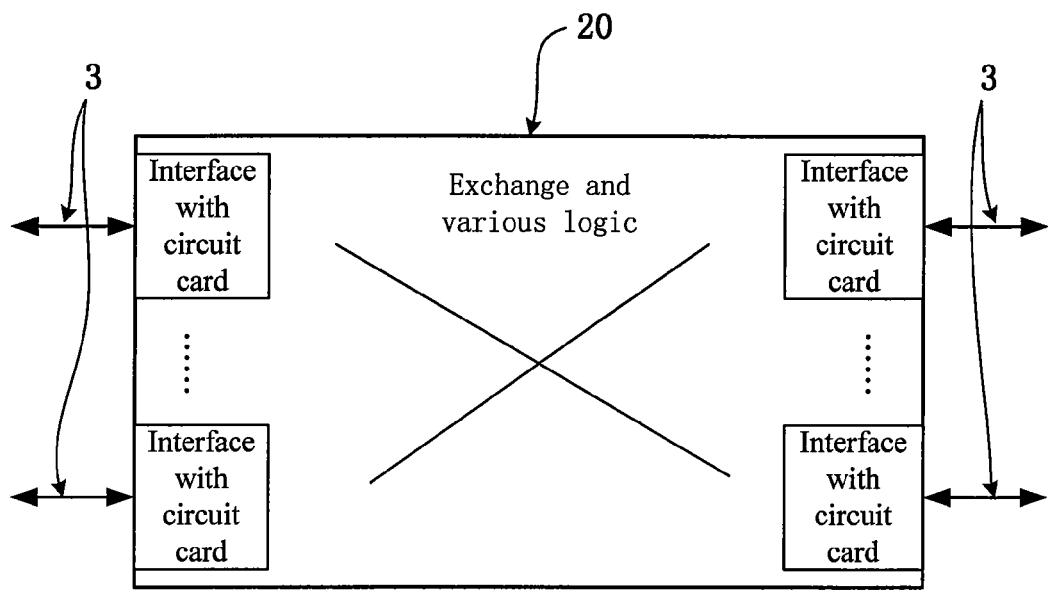

FIGS. 1 and 2 illustrate schematic structures of a circuit card 10 and a switched network card 20, respectively. The circuit card 10 includes interfaces and processing control logic of various kinds. Except when the interface 2 connecting with a switched network needs to be restricted, a user according to a particular product requirement can define the interface 1 connecting with outsides and the others. The switched network card 20 has exchange function and logic processing function of various kinds, and includes the interface 3, which connects with circuit card 10. The interface 3 interconnects with the circuit card's switched network interface 2, and they have the same standard.

Figure 3:
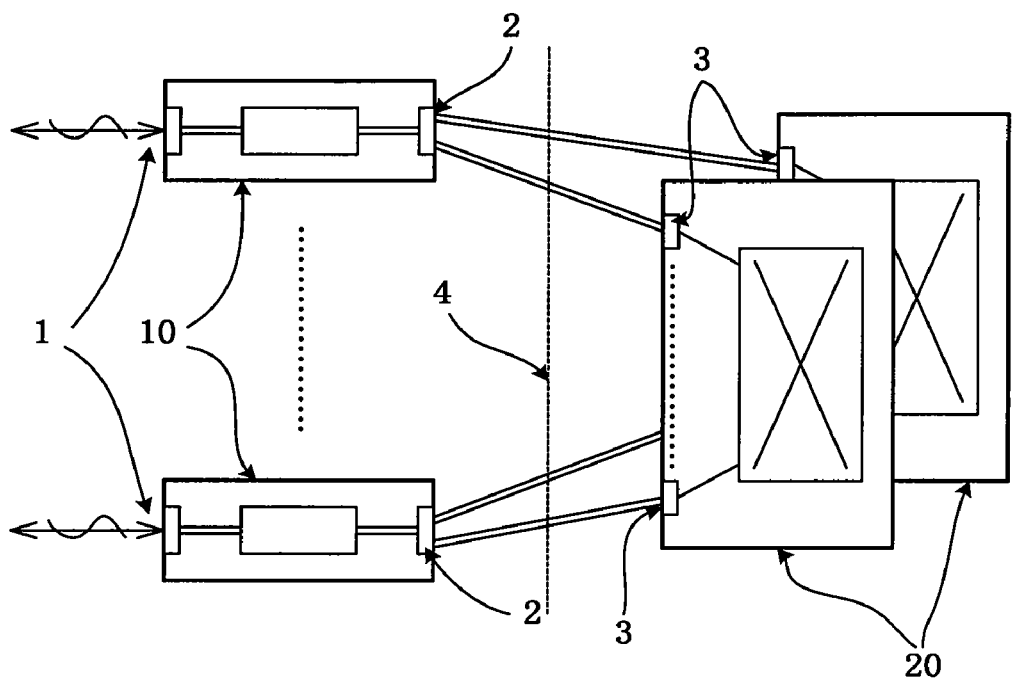

FIG. 3 illustrates the interconnection between switched network card 20 and circuit card 10. There are two switched network cards 20, one of which is the main and the other is the backup. The two switched network cards 20 are connected with circuit card 10 by standard interface 2 and 3. The purpose of two switched network cards 20 is reliability.

The interconnection between switched network card 20 and circuit card 10 is an internal standard interface, such as an electric signal interface. In order to smoothly expand capacity, the interface must be standardized. When capacity is less, for example less than 160 G, the product can be designed within a single framework, and the interface is connected through back plane 4. The physical requirements of the interface signals are: signal transmission mode is high speed, serial and differential mode; and transmission rate is over 1 G. In order to better select an interface device, it is suggested using a standard interface device, such as interface standard of Fiber channel, Gigabit Ethernet, OIF and Infiniband and so on. General transmission rate is 1 Gb/s, 1.25 Gb/s, 1.5 Gb/s, 2.5 Gb/s and 3.125 Gb/s and supports 8 B/10 B signals coding. For a product only one of the transmission rate can be selected, otherwise it is difficult to have a smooth expansion. Therefore, multiple internal interfaces use the same transmission rate. When the capacity is larger, it is suggested using the 2.5 Gb/s.

Figure 4:
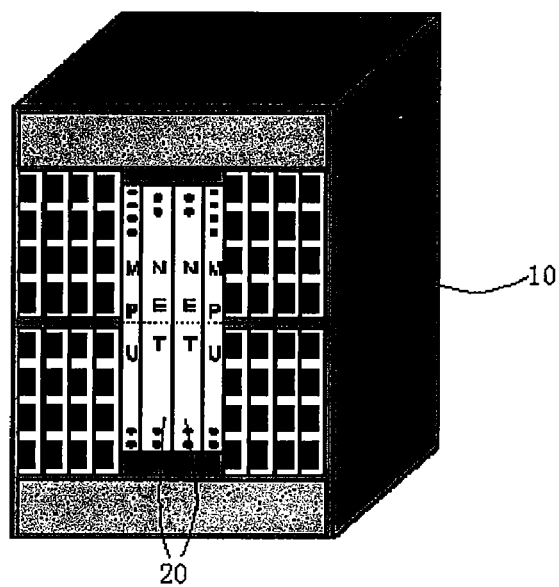

FIG. 3 is the scheme of basic capacity. The switched network cards 20 and the circuit cards 10 are interconnected by back plane 4. The main card and backup card of switched network cards 20 occupy one slot, respectively. Each circuit card 10 occupies one slot. The schematic mechanical structure is shown in FIG. 4. The numbers of circuit cards 10 can be changed according to the port numbers of switched network card 20. In FIG. 4, there are 16 circuit cards 10, two switched network cards (NET) 20 and two cards of main processing unit (MPU). Switched network card 20 and other cards are interconnected by the back plane 4. The main functions of the MPU card are system management and maintenance. Two MPU cards are used for main and backup, respectively.

When system capacity is to be increased, connection between frameworks is needed. In this case for the system reliability, the expansion and reliability must be better solved. The smooth expansion scheme according to the invention is:

Without changing the original circuit card 10, switched network card 20 and back plane 4.

Increasing the numbers of switched network cards 20 and putting them in a special framework for switched network card.

Increasing the numbers of circuit cards 10, which compose framework for circuit card. The multiple frameworks of circuit cards are interconnected with the special framework of switched network card by parallel optical fiber. At the same time, the slot originally for switched network card 20 is used for an interface card which interconnects with the special framework of the switched network card.

Figure 5:
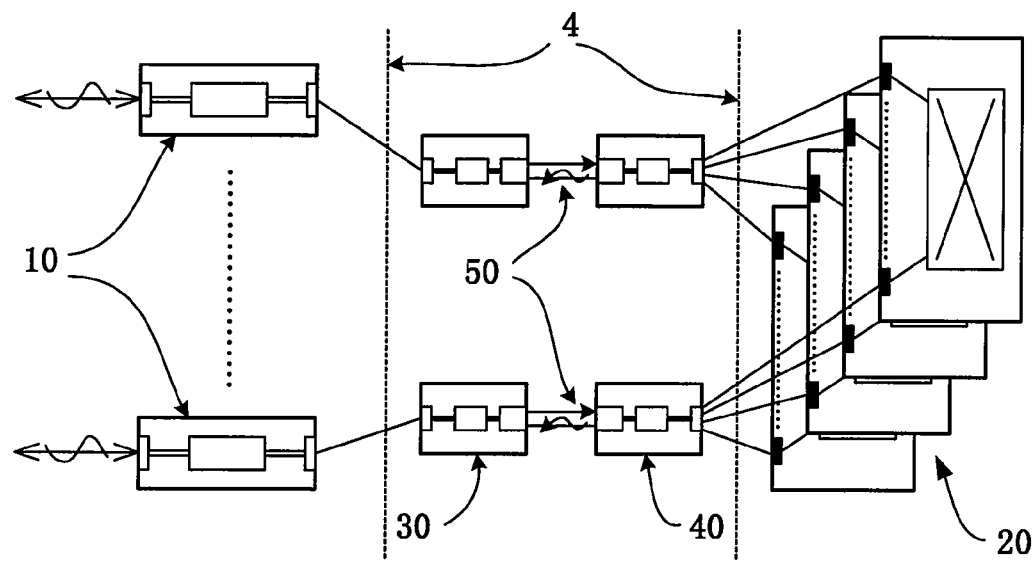

Referring to FIG. 5, the dotted line 4 is the back plane, and 50 is optical fiber. In this scheme, two kinds of cards are added: one is an interface transfer card 30 and the other is an interface card 40 of a switched network. The interface transfer cards 30 are inserted in the slots, in which originally the switched network cards 20 were inserted when there was only one framework. Each circuit card 10 corresponds to one interface transfer card 30. The interface card 40 of the switched network and the increasing switched network cards 20 are put in a special framework of switched network cards. Each circuit card 10 corresponds with one interface card 40 of a switched network, that is the interface cards 40 of a switched network and interface transfer cards 30 correspond one to one. The schematic outside view of a mechanical structure of the scheme is shown in FIG. 6.

Figure 6:
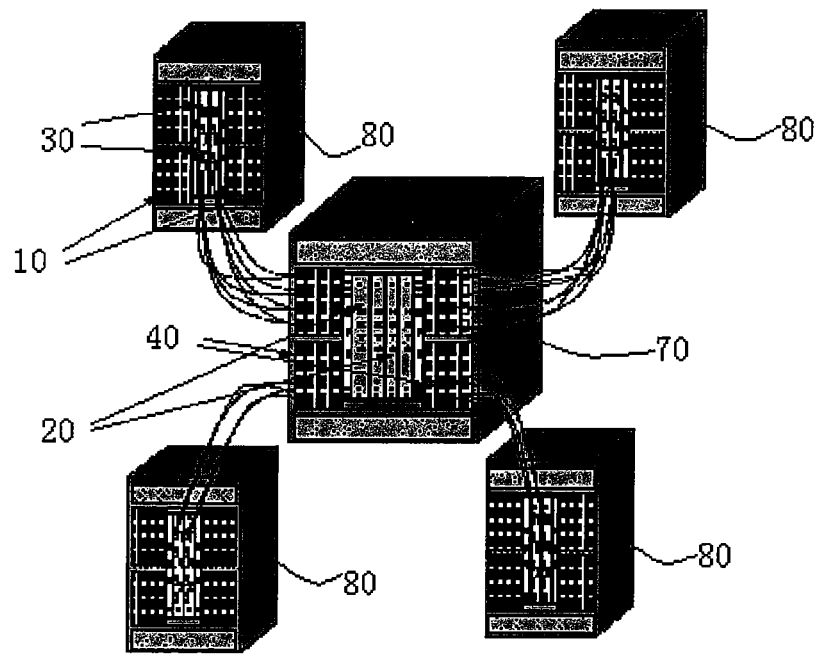
FIG. 6 is an outside view of an exemplary mechanical structure of the invention.

FIG. 6 illustrates two kinds of frameworks: one is the circuit card framework 80 including circuit cards 10 and interface transfer cards 30, and another is a special framework 70 including switched network cards 20 and interface cards 40 of the switched network. This provides the smooth capacity expansion scheme. When increased capacity is desired, if the capacity of switched network card 20 is enough to support the desired increase, smooth capacity expansion can be achieved by increasing the numbers of interconnecting circuit card frameworks 80. FIG. 6 shows only four circuit frameworks and four switched network cards. In a real situation, the numbers of circuit card frameworks 80 can be more and the numbers of switched network cards 20 can be more too. Smoothly increasing capacity is implemented by smoothly increasing the circuit card frameworks 80 and switched network cards 20.

Therefore, the invention breaks the limitation of a single framework and makes the implementation of smooth expansion to be real.

Figure 7:
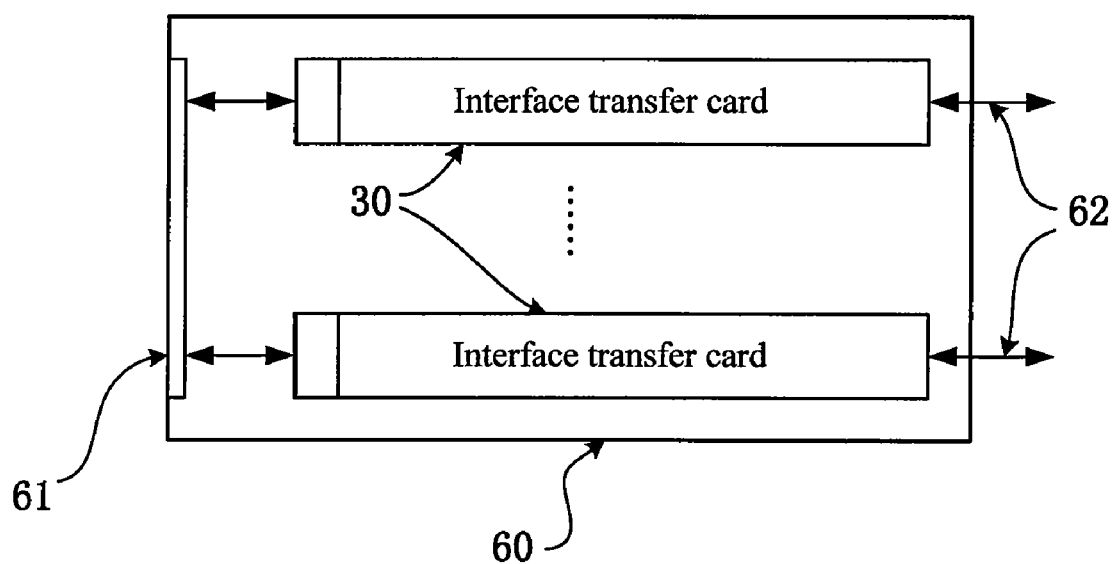
FIG. 7 is a schematic diagram of a base card.

In the invention, in order to use sufficiently and without influence of back plane 4 in circuit card framework, the design of interface transfer card 30 must be more compact. As the function is simple and the devices are less for interface transfer card 30, its structure can be in miniature. Many interface transfer cards 30 in miniature can be inserted in a base card, so that each one of them can be inserted and removed independently. When replacing an interface transfer card 30, it is assured that another circuit card 10 will not be influenced, and this is an on-line exchange. The base care is a passive card. FIG. 7 illustrates the schematic connection of the base card. Multiple . pieces of interface transfer card 30 in miniature are all inserted on the passive base card 60. Passive base card 60 is inserted on the back plane by interface 61, which creates the corresponding connecting relationship between circuit card 10 and interface card 30. Interface 62 is an optical fiber interface.

Similarly, the interface card 40 of a switched network inserted on the special framework of switched network card can employ the same structure to make the structure more compact.

In addition, circuit card 10 and switched network card 20 can all have backup cards. When the main card is removed, or is at fault, or stops working, the backup card will replace the work of main card, to keep the system operating continuously and provide uninterrupted service. Therefore, when the expansion is from a signal framework to multiple frameworks, the backup card can be first removed, then exchanged the interface transfer card 30, interface card of switched network 40 etc. After the exchanging, it is switched to operate on the backup switched network card, then exchanging the main switched network card without interrupting the service.

Simulation test shows that the invention implements smooth expansion, without interrupting the service and with reliable performance.

The above is only one embodiment of the invention, and does not limit the scope of the invention. The invention implements the framework interconnection by adding the interface transfer card, interface card of a switched network and optical fiber between the circuit card and the switched network card. When expanding capacity, the original circuit card and switched network card need not be changed. One only need to increase smoothly the numbers of switched network cards and frameworks of circuit cards. This implements the smooth expansion and protects the client investment. Under the spirit and principle of the invention, any update, replacement or improvement, etc. are all included within the scope of the claims of the invention.

The invention claimed is:

1. A system for data communication, the system comprising:
   a first circuit card;
   a first transfer card coupled to the first circuit card;
   a second circuit card;
   a second transfer card coupled to the second circuit card;
   a first switched network card;
   a first interface card coupled to the first switched network card;
   a second interface card coupled to the first switched network card;
   a first data communication link connecting the first transfer card and the first interface card; and
   a second data communication link connecting the second transfer card and the second interface card;
   wherein:
      the first switched network card is coupled to the first interface card and the second interface card; and
      the first switched network card and the first circuit card are different types of cards
   wherein:
      the first transfer card, the first circuit card, and the first backplane are associated with a first framework;
      the first interface card, the second interface card, the first switched network card, and the third backplane are associated with a second framework, the first framework and the second framework being associated with different physical locations; and
      the first transfer card has no direct connection to the second interface card to assure that the second circuit card is not influenced when the first transfer card is replaced.

2. The system of claim 1 wherein the first switched network card is configured to perform an exchange function between the first circuit card and the second circuit card.

3. The system of claim 1 wherein the first switched network card is further configured not to receive any data signal without through a circuit card.

4. The system of claim 1 wherein:
the first transfer card is coupled to the first circuit card through at least a first backplane;
the second transfer card is coupled to the second circuit card through at least a second backplane;
the first backplane and the second backplane are associated with different physical locations.

5. The system of claim 4 wherein:
the first transfer card, the first circuit card, and the first backplane are associated with a first framework;
the second transfer card, the second circuit card, and the second backplane are associated with a second framework;
the first framework and the second framework are associated with different physical locations.

6. The system of claim 1 wherein:
the first transfer card is coupled to the first circuit card through at least a first backplane;
the first interface card is coupled to the first switched network card through at least a second backplane;
the first backplane and the second backplane are associated with different physical locations.

7. The system of claim 6 wherein:
the first transfer card, the first circuit card, and the first backplane are associated with a first framework;
the first interface card, the first switched network card, and the second backplane are associated with a second framework;
the first framework and the second framework are associated with different physical locations.

8. The system of claim 1, and further comprising a second switched network card coupled to both the first interface card and the second interface card.

9. The system of claim 1 wherein each of the first data communication link and the second data communication link includes an optical fiber.

10. The system of claim 1 wherein:
the first transfer card is coupled to the first circuit card through a base card and a backplane;
the base card is coupled directly to both the first transfer card and the backplane.

11. The system of claim 1 wherein:
the first interface card is coupled to the first switched network card through a base card and a backplane;
the base card is coupled directly to both the first interface card and the backplane.

12. The system of claim 1 wherein the first transfer card and the second transfer card are different.

13. The system of claim 1 wherein the first interface card and the second interface card are different.

14. The system of claim 1 wherein the first data communication link and the second data communication link are different.

15. A system for data communication, the system comprising:
a first circuit card coupled to a first backplane;
a second circuit card coupled to a second backplane;
a switched network card coupled to the first circuit card and the second circuit card, the switched network card being configured to:
receive a first signal from the first circuit card;
receive a second signal from the second circuit card; and
process at least information associated with the first signal and the second signal;
wherein:
the first backplane and the second backplane are associated with different physical locations; and
the switched network card is further configured not to receive any data signal that is not sent from or through a circuit card
wherein:
the first backplane has no direct connection to the second backplane to assure that the second circuit card is not influenced when the first transfer card is replaced.

16. The system of claim 15 wherein:
the first circuit card and the first backplane are associated with a first framework;
the second circuit card and the second backplane are associated with a second framework;
the first framework and the second framework are associated with different physical locations.

17. The system of claim 15 wherein:
the switched network card is coupled to a third backplane;
the third backplane and the first backplane are associated with different physical locations;
the third backplane and the second backplane are associated with different physical locations.

18. The system of claim 17 wherein:
the first circuit card and the first backplane are associated with a first framework;
the second circuit card and the second backplane are associated with a second framework;
the switched network card and the second backplane are associated with a third framework;
the third framework and the first framework are associated with different physical locations;
the third framework and the second framework are associated with different physical locations;
the first framework and the second framework are associated with different physical locations.

19. The system of claim 15 wherein the process at least information associated with the first signal and the second signal comprises perform at least one logic function.

20. The system of claim 15 wherein the process at least information associated with the first signal and the second signal comprises perform at least one exchange function.

21. The system of claim 15 wherein the circuit card and the switched network card are different types of cards.

22. A method for making a system for data communication, the method comprising:
providing a first framework associated with a first circuit card and a first transfer card, the first transfer card being coupled to the first circuit card;
providing a second framework associated with a second circuit card and a second transfer card, the second transfer card being coupled to the second circuit card;
providing a third framework associated with a switched network card and a first interface card and a second interface card, the first interface card being coupled to the switched network card, the second interface card being coupled to the switched network card;
connecting the first transfer card and the first interface card;
connecting the second transfer card and the second interface card;
wherein the switched network card is configured to:
receive a first signal from the first circuit card;
receive a second signal from the second circuit card;
process at least information associated with the first signal and the second; and
connect the first transfer card, the first circuit card, and the first backplane are associated with a first framework, wherein the first interface card, the second interface card, the first switched network card, and the third backplane are associated with a second framework, the first framework and the second framework being associated with different physical locations, and wherein the first transfer card has no direct connection to the second interface card to assure that the second circuit card is not influenced when the first transfer card is replaced.

23. The method of claim 22 wherein the switched network card is further configured not to receive any data signal without through a circuit card.

24. The method of claim 22 wherein the process at least information associated with the first signal and the second signal comprises perform at least one logic function.

25. The method of claim 22 wherein the process at least information associated with the first signal and the second signal comprises perform at least one exchange function.

26. The method of claim 22 wherein the first circuit card and the switched network card are different types of cards.

* * * * *